(12) United States Patent
Ingels et al.

(10) Patent No.: US 8,458,493 B2
(45) Date of Patent: Jun. 4, 2013

(54) PROTECTION OF A DIGITAL CONTENT ON A PHYSICAL MEDIUM

(75) Inventors: Didier Ingels, Grand-Rosiere (BE); Guy Restiau, Rixensart (BE)

(73) Assignee: Proton World International N.V., Zaventem (BE)

( * ) Notice: Subject to any disclaimer, the term of this patent is extended or adjusted under 35 U.S.C. 154(b) by 1195 days.

(21) Appl. No.: 11/512,962

(22) Filed: Aug. 30, 2006

(65) Prior Publication Data

US 2007/0058809 A1    Mar. 15, 2007

(30) Foreign Application Priority Data

Aug. 31, 2005 (FR) ...................................... 05 52637

(51) Int. Cl.
  *G06F 21/00* (2006.01)
(52) U.S. Cl.
  USPC ......................................................... 713/193
(58) Field of Classification Search
  USPC .................. 380/28–30, 37, 42, 203; 713/165, 713/193
  See application file for complete search history.

(56) References Cited

U.S. PATENT DOCUMENTS

| 5,974,485 | A | 10/1999 | Kruschinski | |
|---|---|---|---|---|
| 6,067,621 | A * | 5/2000 | Yu et al. | 713/172 |
| 6,101,477 | A | 8/2000 | Hohle et al. | |
| 6,622,205 | B1 | 9/2003 | Weiss | |
| 2001/0010722 | A1 * | 8/2001 | Enari | 380/277 |
| 2002/0048369 | A1 * | 4/2002 | Ginter et al. | 380/277 |
| 2002/0071557 | A1 * | 6/2002 | Nguyen | 380/251 |
| 2002/0166048 | A1 * | 11/2002 | Coulier | 713/169 |
| 2003/0026427 | A1 * | 2/2003 | Couillard | 380/277 |
| 2003/0051152 | A1 * | 3/2003 | Wuidart et al. | 713/193 |
| 2003/0081785 | A1 * | 5/2003 | Boneh et al. | 380/277 |
| 2003/0163697 | A1 * | 8/2003 | Pabla et al. | 713/171 |
| 2004/0030891 | A1 * | 2/2004 | Kurihara | 713/168 |
| 2005/0129244 | A1 * | 6/2005 | Catherman et al. | 380/277 |

FOREIGN PATENT DOCUMENTS

EP     1124350 A1    8/2001

OTHER PUBLICATIONS

French Search Report from French Patent Application 05/52637, filed Aug. 31, 2005.
French Search Report from French Patent Application 05/52638, filed Aug. 31, 2005.
Taima K. "Can We Ever Charge Napster Users?" IEEE Multimedia, IEEE Service Center, New York, NY, US, Oct. 2002, pp. 76-81, XP002309104 ISSN: 1070-986X.

* cited by examiner

*Primary Examiner* — Gilberto Barron, Jr.
*Assistant Examiner* — David Le
(74) *Attorney, Agent, or Firm* — Wolf, Greenfield & Sacks, P.C.

(57) ABSTRACT

A method of storage of digital data on a physical medium equipped with calculation circuitry, by ciphering the data using a symmetrical algorithm with a ciphering key independent from the recorder, and by transferring the ciphering key onto the medium or its calculation by an asymmetrical algorithm and a read method in which, on first reading from the physical medium, a user key is transferred to the calculation circuitry by an asymmetrical ciphering process, a ciphered key of the data ciphering key is calculated in the calculation circuitry of the medium and by a symmetrical algorithm with the user key, and the asymmetrical ciphering portion of the calculation circuitry are deactivated.

7 Claims, 2 Drawing Sheets

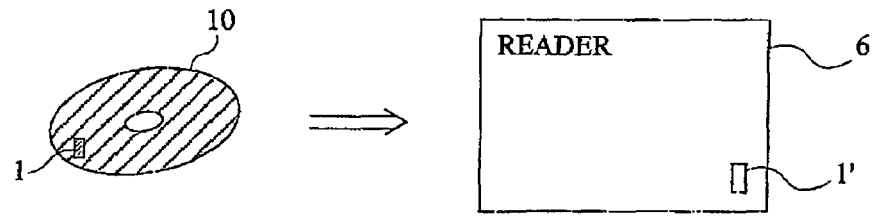
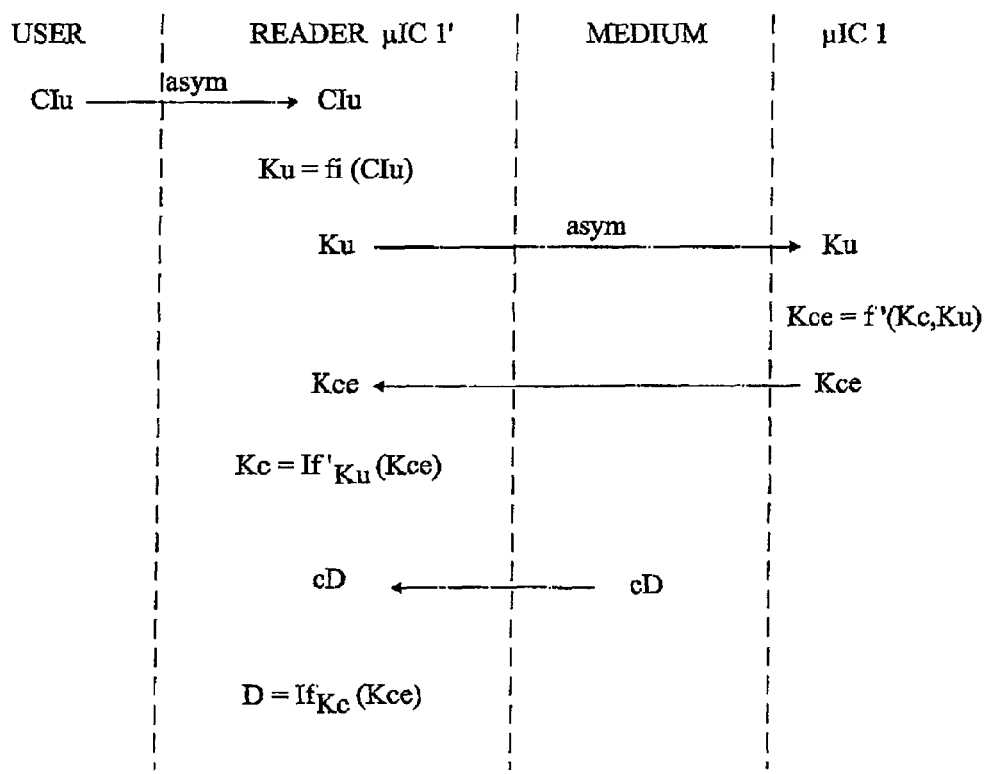
Fig 6

PROTECTION OF A DIGITAL CONTENT ON A PHYSICAL MEDIUM

BACKGROUND OF THE INVENTION

1. Field of the Invention

The present invention generally relates to the storage of digital data, and more specifically to multimedia data, on a physical medium.

The present invention more specifically relates to the protection of digital data contained on such a medium against unauthorized reproductions or changes, especially by the creator of the concerned medium. "Creator of the medium" is used to designate the person who has, first, recorded the data on the physical medium. He is not necessarily the author of the content of the multimedia data, nor is he necessarily the medium manufacturer.

An example of application of the present invention relates to multimedia media intended to receive music files or images in digital form.

2. Discussion of the Related Art

It has already been provided to cipher or encrypt data recorded on a multimedia medium (for example, a CDROM, a digital floppy disk, etc.) so that these data can only be read by a reader having the ciphering key. However, unless the medium manufacturing and the data recording in the manufacturing premises is individualized to individualize the key according to the user, the same medium can be read by any reader having this key. An object precisely is to forbid the reading from the physical medium by an unauthorized reader.

An example of a system of protection against illicit copies of any digital medium is described in note "Content protection for recordable media specification"—"Introduction and common cryptographic elements", published by 4C-entity, Rev 0.03, Jun. 28, 2000, which is incorporated herein by reference.

It has also be provided to equip a physical medium with multimedia data of an integrated circuit (microcircuit) provided with means of calculation and means of storage of a list of identification codes of readers allowed to read the data. This list is recorded at the same time as the data and the corresponding readers are then capable of deciphering the stored data on the physical medium from the moment that the microcircuit of this medium contains their identifier. Such a solution is described, for example, in document EP-A-1291868. A disadvantage of this solution is that it requires for the readers authorized or qualified to read the data contained in the physical mediums to be known in advance to establish a list thereof.

SUMMARY OF THE INVENTION

The present invention aims at overcoming all or part of the disadvantages of digital data protection systems contained on physical media against copies or a change unauthorized by the author or the like.

The present invention also aims at avoiding the need to store a list of authorized readers.

The present invention also aims at authorizing both the copy of the multimedia data and their reading from the time when the user is authorized for it.

The present invention also aims at avoiding that the copy of the multimedia content weakens the protection of the stored data.

To achieve all or part of these objects, the present invention provides a method of storage, by a recorder, of digital data on a physical medium equipped with calculation means, comprising, on first use of the medium in write mode, the steps of:

ciphering the data using a symmetrical algorithm with a ciphering key independent from the recorder; and transferring the ciphering key onto said medium or its calculation means by an asymmetrical algorithm.

According to an embodiment of the present invention, said ciphering key is derived from a key transmitted to the recorder by means of an asymmetrical algorithm.

According to an embodiment of the present invention, the calculation means comprise a symmetrical function for subsequent transmission of the ciphering key to a reader.

The present invention also provides a method of reading, by a reader, of digital data ciphered using a symmetrical algorithm with a ciphering key on a physical medium equipped with calculation means, comprising, on first reading from the physical medium, the steps of:

transferring to the calculation means, by an asymmetrical ciphering process, a user key;

calculating, in said calculation means of the medium and by a symmetrical algorithm with the user key, a ciphered key of said data ciphering key; and deactivating the asymmetrical ciphering means of the calculation means.

According to an embodiment of the present invention, said ciphered key is transmitted to the reader for decoding of the ciphered data on the physical medium.

According to an embodiment of the present invention, said user key is derived by the reader in non-reversible fashion from an identifier of a user.

The present invention also provides a physical medium for digital data, comprising an electronic circuit for implementing the method of storage and/or the method of reading of ciphered data.

The present invention also provides a recorder of digital data on a physical medium.

The present invention also provides a reader of digital data from a physical medium.

The present invention also provides a system for storing digital data, comprising:

at least one recorder; and at least one physical medium for digital data.

The present invention also provides a digital data read system, comprising:

at least one reader; and at least one physical medium for digital data.

The foregoing and other objects, features, and advantages of the present invention will be discussed in detail in the following non-limiting description of specific embodiments in connection with the accompanying drawings.

BRIEF DESCRIPTION OF THE DRAWINGS

FIG. 5 very schematically shows in the form of blocks elements of a system involved in an implementation mode of a digital data reading according to the present invention; and FIG. 6 illustrates the exchanges between the different components of a system on reading of digital data according to an embodiment of the present invention.

DETAILED DESCRIPTION

Figure 1:
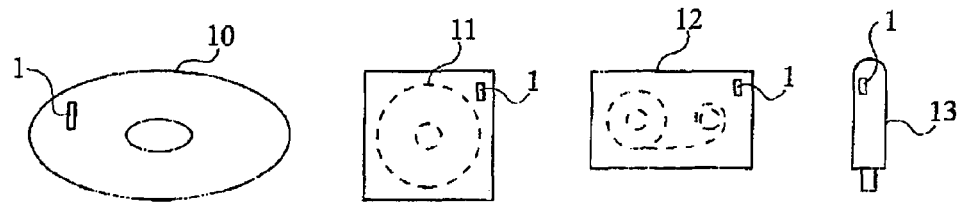
FIG. 1 very schematically shows an embodiment of a physical medium for digital data according to the present invention.

The same elements have been designated with the same reference numerals in the different drawings. For clarity, only those steps and elements which are useful to the understanding of the present invention have been shown in the drawings and will be described hereafter. In particular, the calculations implemented by the actual ciphering and authentication algorithms have not been described in detail and can use known operations. Further, the means of data exchange between the readers-recorders and the data medium have not been described in detail and here again can use known means.

FIG. 1 very schematically shows examples of physical media of digital data storage according to the present invention.

A physical medium usable in the context of the present invention is formed of any device appropriate for the storage of digital data, provided that it can comprise or be equipped with calculation means. For example, as illustrated in FIG. 1, it may be a CDROM or a DVROM 10, a disk 11, a digital tape 12, a memory key 13, etc. Such media are provided with calculation means, for example, an electronic circuit 1. This circuit, for example, is physically placed on the medium. Circuit 1 is intended to contain at least a digital quantity forming a ciphering key and to execute authentication and ciphering calculations as will be seen hereafter. As a variation, the key(s) is (are) stored in an area of the actual physical medium. The physical medium and the chip may be one and the same, for example, in the case of a smart card provided with digital memories of significant capacities, for example, a flash memory, or in the case of a memory key integrating calculation means.

Figure 2:
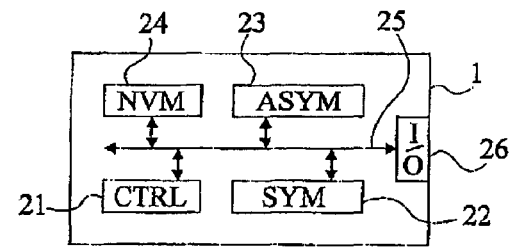
FIG. 2 very schematically shows in the form of blocks an embodiment of an integrated circuit of a physical medium of FIG. 1.

FIG. 2 very schematically shows in the form of blocks an example of an electronic circuit 1 (microcircuit) of the type equipping the physical media to which the present invention applies. Circuit 1 is preferably contained in a single integrated circuit chip. It comprises a control and calculation circuit 21 (CTRL) of central processing unit type, at least one function 22 (SYM) of implementation (hardware and/or software) of a ciphering algorithm of symmetrical type sharing a key with no transmission thereof, and at least one function 23 (ASYM) of implementation (hardware and/or software) of an asymmetrical algorithm of authentication and transfer of a secret (ciphering key, in particular) and, preferably, a non-volatile storage element 24 (NVM) intended to contain the digital quantities representing the keys if said keys are not directly contained in the physical medium.

A symmetrical algorithm, also called secret key algorithm, requires the key (digital quantity) used to cipher digital data to be used for the deciphering thereof. Such an algorithm thus requires for the coder and the decoder to be in possession of the same key. A symmetrical algorithm generally is of faster execution than an asymmetrical algorithm.

An asymmetrical algorithm, generally called a public key algorithm as opposed to the secret key symmetrical algorithm, uses different keys for ciphering and deciphering same the digital data. The data are generally ciphered with a public key and deciphered with a so-called private key, known by the sole addressee. Such algorithms are often used in the context of a tripartite system (transmitter, receiver, trusted third party) and then enable combining the ciphering with an authentication of the parties.

The different elements of circuit 1 communicate by means of one or several data, address, and control buses 25, together, and with an input/output element 26 (I/O) of communication with the outside of circuit 1, with or without contact.

Figure 3:
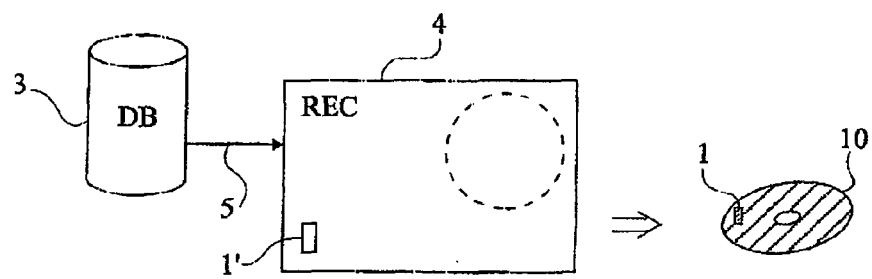
FIG. 3 very schematically shows in the form of blocks elements of a system involved in an implementation mode of a digital data recording on a medium of the present invention.

FIG. 3 very schematically illustrates, in the form of blocks, an embodiment of an initial recording of digital data on a physical medium 10 according to the present invention.

Digital data to be stored (for example, audio or video files) are initially contained in a source element, for example, of data base type 3 (DB). It may also be a distant data source originating from a private (intranet) or public (internet) digital network or from any other element containing multimedia digital data. It may even be a physical storage medium 10, 11, 12, or 13 of the type implemented by the present invention.

To store digital data contained in source element 3 on a physical medium of the present invention, a recorder 4 (REC) or a reader-recorder capable of receiving, over a link 5, the data contained in source element 3, and comprising read/write means (not detailed) of at least one type of physical media, is used. Recorder 4 is also equipped with an electronic circuit 1', for example, a circuit (microcircuit) similar to circuit 1 described in relation with FIG. 2, and thus has means (hardware and/or software) of calculation and implementation of symmetrical and asymmetrical algorithms.

Figure 4:
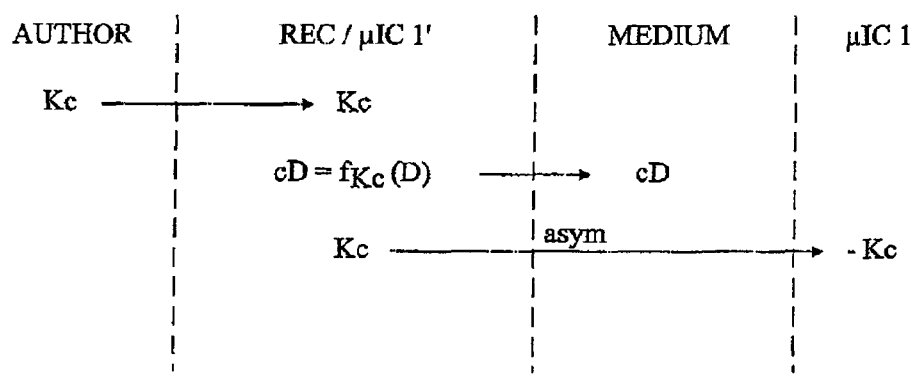
FIG. 4 illustrates the exchanges between different elements involved in the storage of digital data according to an embodiment of the present invention.

FIG. 4 illustrates an embodiment of the present invention for the initial storage of multimedia data in ciphered manner on a blank medium. The creator or designer of the medium (AUTHOR) initializes the recording system (REC) by introducing into it a key Kc of a symmetrical mechanism. Possibly, this symmetrical secret Kc is derived from another key. According to the security level of the link between the input device (keyboard, smart card, etc.) and the recorder, the transmission may use a transient key originating from an asymmetrical authentication protocol.

Recorder REC containing circuit 1' (µIC) uses key Kc to cipher multimedia data D by means of a symmetrical ciphering function $f_{Kc}$ to obtain a protected digital content cD ($cD=f_{Kc}(D)$). Content cD is then transferred onto the physical medium. Further, the recorder transmits secret Kc to the microcircuit (µIC) 1 of the physical medium. This transmission is performed by using a transient secret (not shown), derived from an asymmetrical authentication (ASYM) between the recorder and microcircuit 1. Once it has received key Kc, microcircuit 1 of the support is no longer able to receive a new secret of the same type. This functionality is invalidated in hardware and/or software fashion (for example, by programming of an irreversible-programming non-volatile element conditioning the execution of the function). The physical medium can thus be considered as belonging to the author.

FIG. 5 schematically illustrates, in the form of blocks, elements of a read system according to an embodiment of the present invention. The physical medium (for example, 10) containing ciphered data cD and having its microcircuit 1 containing key Kc is introduced into a reader 6 (READER) or read/write device. This reader comprises, like recorder 4 (FIG. 3), means (for example, in the form of an electronic circuit 1') of calculation and implementation (software and/or hardware) of asymmetrical and symmetrical algorithms.

Preferably, the readers and recorders used by the present invention are of trusted platform module type (TPM). They may comprise means of communication with one or several trusted third parties (not shown) for authentication and transient key obtaining needs.

According to a preferred embodiment of the present invention, a first reading of a physical support comes along with a customization of this support for the concerned user.

FIG. 6 illustrates the exchanges between the different components of a read system on first reading of a protected digital support according to the present invention.

The user initializes its read (and copy) system READER by means of an identification code Clu. This identification code is, for example, keyed in on a keyboard, or contained in a smart card readable by the reader with or without contact. Identification code Clu of the user is permanently stored in the reader or, as a variation, must be input for each new use. As for the transfer of key Kc between the author and the recorder (FIG. 3), according to the security level of the link between the user and the reader, code Clu is transmitted either directly or by an asymmetrical algorithm.

The reader transforms identification code Clu into a symmetrical authentication key Ku by an irreversible function fi (Ku=fi(Clu)).

When a physical medium containing coded data is introduced for a first time into a reader, key Ku assigned to the user is transmitted to microcircuit 1 of the physical support by means of an asymmetrical process. Secret Ku is thus transmitted to microcircuit 1 by means of a transient secret originating from the asymmetrical process. The asymmetrical process is also used to authenticate the media and the reader as belonging to a same field. This especially enables negotiating a session key on each asymmetrical exchange between the two elements.

On reception of secret Ku, microcircuit 1 switches to a so-called owner function mode in which the asymmetrical ciphering means are invalidated (in software or hardware fashion), so that secret Kc with which the digital data have been coded on the support can then only be transmitted in symmetrical mode.

This amounts to assigning the recorded medium to the user identified by key Ku.

For the actual reading, microcircuit 1 ciphers key Kc by means of key Ku with a symmetrical function f' (identical or different from function f) sharing a key with no transmission thereof (Kce=f'$_{Ku}$(Kc)). Result Kce is transmitted to the reader (to its microcircuit 1') which, owning key Ku and knowing the inverse algorithm If' of symmetrical ciphering algorithm f', is capable of deducing therefrom key Kc with which the data have been ciphered on the medium. Ciphered data cD are transmitted from the medium to the reader which, knowing the inverse function If of that (f) with which they have been ciphered, is able to give them back from key Kc and data cD (D=If$_{Kc}$(cD)).

According to the discussed embodiment, microcircuits 1 and 1' of the different media and readers each own an asymmetrical secret to be able to mutually authenticate. As soon as this authentication is over, it exchanges a coded symmetrical secret with this asymmetrical secret (transmission of key Ku). As soon as the two circuits own symmetrical secret Ku, they deactivate the asymmetrical mode that they comprise.

If the medium is introduced into a reader that does not have key Ku, but another user's key Ku', this reader does not succeed in decoding key Kc since it does not have secret Ku. Now, microcircuit 1 of the physical support has invalidated its asymmetrical ciphering means, so that it is not able to reset the user key with which it is associated.

Preferably, an authorized user can however input its identifier Clu in the third reader. This identifier is transformed by the reader into a key Ku which will be saved, preferably in an ephemeral work area. The third reader can then decipher the data as described hereabove in relation with FIG. 6. As soon as the reading is over or the reader is reset, the ephemeral area for storing key Ku is erased.

To create a copy of the ciphered data on another physical medium, a blank medium containing a microcircuit 1 in which the asymmetrical process has not been invalidated yet is used. By introducing this medium into a recorder authorized by authentication of the user based on its identifier Clu. Key Kc is transmitted to microcircuit 1 by the asymmetrical process. Then, the data coded by key Kc are transferred to the new support. Finally, key Ku is transmitted to microcircuit 1 by the asymmetrical process. As soon as key Ku is present in microcircuit 1 of the support, the asymmetrical functions are invalidated.

Since key Kc, preferably derived from the author's key, is known by the sole microcircuit 1 associated with the physical medium, the copy of coded data cD does not enables an unauthorized user to read them.

The fact of transferring the user key Ku to the physical medium containing the protected data avoids not only lists of authorized readers but also enables the authorized user to make the copies that he wants of this medium, knowing that he will be the only one to be able to read them. This further enables individualizing the different physical supports so that the knowledge of a key of a support does not enable a person attempting to fraudulently read other media which would have been coded with another key. This advantage is obtained by diversifying key Kc of the author (FIG. 4) for its storage on the microcircuit of the recording media.

Of course, the present invention is likely to have various alterations, improvements, and modifications which will readily occur to those skilled in the art. In particular, the practical implementation of the symmetrical and asymmetrical algorithms usable by the present invention is within the abilities of those skilled in the art based on the functional indications given hereabove.

The present invention may be implemented with any symmetrical ciphering algorithm sharing a key with no transmission thereof, for example, such as described in document FR-A-2716058. A so-called Diffie-Helmann algorithm described, for example, in work "Applied Cryptography" by B. Schneier, published by Wiley in 1996, pages 513 to 519, or in document U.S. Pat. No. 4,200,770 may also be used. A so-called DES (Data Encryption Standard) algorithm described, for example, in above-mentioned work Applied Cryptography, pages 265 to 301, may also be used. Each of these documents is incorporated herein by reference.

Any symmetrical algorithm may be used for the key transfer. For example, a so-called RSA algorithm such as described in above-mentioned work Applied Cryptography, pages 466 to 474, and in document U.S. Pat. No. 4,405,829, may be used. Each of these documents is incorporated herein by reference.

The ciphering of the multimedia data stored on the physical medium by means of single key Kc may be performed by means of any above-mentioned symmetrical algorithm, or again the algorithm described in article "MPEG Video Encryption In Real Time Using Secret Key Cryptography" by C. Shi, S-Y. Wang, and B. Bhargava, published by the Department of Computer Science of Purdue University, 1999. Each of these documents is incorporated herein by reference.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of reading, by a reader, digital data ciphered using a symmetrical algorithm with a data ciphering key on a physical medium, comprising:
   providing a physical medium for storage of the digital data, the physical medium equipped with a calculation means; and, on first reading from the physical medium:
   transferring to the calculation means, by an asymmetrical ciphering process, a user key;
   calculating, in said calculation means of the medium and by a symmetrical algorithm with the user key, a ciphered key of said data ciphering key;
   invalidating, on reception of the user key by the calculation means, the asymmetrical ciphering process of the calculation means so that the calculation means is not able to reset the user key which was received by the calculation means from the reader, so that the data ciphering key with which the digital data on the physical medium have been coded can then only be transmitted in a symmetrical mode; and
   reading decoded digital data from the physical medium while the asymmetrical ciphering process is deactivated.

2. The method of claim 1, wherein said ciphered key is transmitted to the reader for decoding of the ciphered data on the physical medium.

3. The method of claim 1, wherein said user key is derived by the reader in non-reversible fashion from an identifier of a user.

4. A physical medium for storage of digital data, comprising an electronic circuit configured to implement the method of claim 1.

5. A reader of digital data from a physical medium, configured to implement the method of claim 1.

6. A method of reading, by a reader, digital data ciphered using a symmetrical algorithm with a ciphering key on a physical medium, the method comprising:
   providing a physical medium for storage of the digital data, the physical medium including a calculation circuit; and, on first reading from the physical medium:
   transferring a user key to the calculation circuit using an asymmetrical ciphering process;
   calculating, in the calculation circuit, a ciphered key based on the user key and the ciphering key using a symmetrical algorithm;
   invalidating, on reception of the user key by the calculation circuit, the asymmetrical ciphering process of the calculation circuit so that the calculation circuit is not able to reset the user key which was received by the calculation circuit from the reader, so that the ciphering key with which the digital data on the physical medium have been coded can then only be transmitted in a symmetrical mode;
   transmitting, to the reader, the ciphered key for decoding of the ciphered digital data on the physical medium; and
   reading the decoded digital data while the asymmetrical ciphering process is deactivated.

7. The method of claim 6, wherein the user key is derived by the reader in non-reversible fashion from an identifier of a user.

* * * * *

UNITED STATES PATENT AND TRADEMARK OFFICE
CERTIFICATE OF CORRECTION

PATENT NO. : 8,458,493 B2
APPLICATION NO. : 11/512962
DATED : June 4, 2013
INVENTOR(S) : Didier Ingels et al.

It is certified that error appears in the above-identified patent and that said Letters Patent is hereby corrected as shown below:

In the Specifications:

Col. 5, line 8, should read:
means of an identification code CIu. This identification code Col. 5, line 11, should read:
Identification code CIu of the user is permanently stored in the Col. 5, line 16, should read:
the user and the reader, code CIu is transmitted either directly Col. 5, line 18, should read:
The reader transforms identification code CIu into a sym- Col. 5, line 20, should read:
(Ku = fi(CIu)).

Col. 5, line 65, should read:
tifier CIu in the third reader. This identifier is transformed by Col. 6, line 8, should read:
rized by authentication of the user based on its identifier CIu.

Signed and Sealed this
Sixteenth Day of July, 2013

Teresa Stanek Rea
*Acting Director of the United States Patent and Trademark Office*